United States Patent
Conrad

(10) Patent No.: US 12,090,567 B2
(45) Date of Patent: Sep. 17, 2024

(54) METHOD OF RESISTIVELY WELDING PARTS AND PARTS MADE THEREBY

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 1259 days.

(21) Appl. No.: 16/667,002

(22) Filed: Oct. 29, 2019

(65) Prior Publication Data

US 2021/0121975 A1    Apr. 29, 2021

(51) Int. Cl.
| | | |
|---|---|---|
| *B23K 11/30* | (2006.01) | |
| *B23K 35/02* | (2006.01) | |
| *B29C 65/34* | (2006.01) | |

(52) U.S. Cl.
CPC ........ *B23K 11/309* (2013.01); *B23K 35/0277* (2013.01)

(58) Field of Classification Search
CPC . B29C 64/3404; B29C 65/34; B29C 65/3444; B29C 65/3432; B23K 11/309
See application file for complete search history.

(56) References Cited

U.S. PATENT DOCUMENTS

| | | |
|---|---|---|
| 2,184,739 A | 12/1939 | Fyles |
| 2,647,072 A | 7/1953 | Smith |
| 2,983,306 A | 5/1961 | Resnick |
| 3,071,503 A | 1/1963 | Dubois |
| 3,346,442 A | 10/1967 | Carmody |
| 3,348,640 A * | 10/1967 | Thompson ........ B29C 66/81871 188/250 G |
| 3,876,073 A | 4/1975 | Herbetko |
| 4,586,624 A | 5/1986 | Shaw |
| 5,225,025 A * | 7/1993 | Lambing ........... B29C 66/91421 156/379 |

(Continued)

FOREIGN PATENT DOCUMENTS

| | | | | |
|---|---|---|---|---|
| DE | 102015205656 A1 * | 9/2016 | ........... | B29C 65/346 |
| FR | 1433988 A * | 5/1965 | | |

(Continued)

OTHER PUBLICATIONS

Machine translation of FR1433988A, Aug. 2023 (Year: 2023).*

(Continued)

*Primary Examiner* — Geoffrey S Evans
(74) *Attorney, Agent, or Firm* — Philip C. Mendes da Costa; BERESKIN & PARR LLP/S.E.N.C.R.L., s.r.l.

(57) ABSTRACT

A method of securing a first component part and a second component part together, the method comprising providing an electrically conductive member between a first surface of the first component part and a facing first surface of the second component part and securing the first and second components together by passing a current through the electrically conductive member. The electrically conductive member may comprise a first portion connectable to a source of current and a second portion electrically connected to the first portion and comprising a plurality of sub-conductive members. The electrically conductive member may be distributed across at least 50% of the surface area of the first surface of the first component part.

16 Claims, 10 Drawing Sheets

(56) References Cited

U.S. PATENT DOCUMENTS

| | | | |
|---|---|---|---|
| 5,643,390 A * | 7/1997 | Don | B29C 66/712 |
| | | | 156/313 |
| 8,333,341 B2 | 12/2012 | Long et al. | |
| 8,349,428 B2 | 1/2013 | Conrad | |
| 2004/0055699 A1 * | 3/2004 | Smith | H05B 3/342 |
| | | | 156/273.9 |
| 2005/0205203 A1 * | 9/2005 | Chang | B32B 15/08 |
| | | | 428/458 |
| 2006/0172645 A1 | 8/2006 | Weerth | |
| 2010/0170889 A1 * | 7/2010 | Keite-Telgenbuscher | |
| | | | H05B 3/56 |
| | | | 156/60 |
| 2011/0212331 A1 | 9/2011 | Dyke et al. | |
| 2012/0247641 A1 * | 10/2012 | Ruggiero | B32B 27/20 |
| | | | 156/60 |
| 2019/0232570 A1 * | 8/2019 | Liu | B29C 66/1122 |

FOREIGN PATENT DOCUMENTS

| | | | | |
|---|---|---|---|---|
| KR | 200303552 Y1 | 2/2003 | | |
| WO | WO-9319926 A1 * | 10/1993 | | B29C 65/342 |
| WO | 00/78546 A1 | 12/2000 | | |
| WO | WO-2005042233 A1 * | 5/2005 | | B29C 65/344 |
| WO | 2017070070 A1 | 4/2017 | | |

OTHER PUBLICATIONS

Machine translation of DE-102015205656-A1 (Year: 2024).*
English machine translation of the Abstract of KR200303552, published on Feb. 21, 2003.

* cited by examiner

METHOD OF RESISTIVELY WELDING PARTS AND PARTS MADE THEREBY

FIELD

This disclosure relates generally to resistive welding, and in particular to an electrically conductive member for use in resistive welding, conductive members that may be used for resistive welding and parts made by resistive welding.

INTRODUCTION

The following is not an admission that anything discussed below is part of the prior art or part of the common general knowledge of a person skilled in the art.

Various types of welding techniques and products are known, including gas welding, laser welding, and resistive welding. Further, various resistive welding techniques and produces are known, including the use of a wire to generate heat between component parts.

For example, U.S. Pat. No. 8,349,428 (Conrad) discloses a method to manufacturing a part using a single conductive member positioned between two components that are to be secured together.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, an electrically conductive member is used to secure a first component part and a second component part together. The electrically conductive member may be distributed over a substantial portion of the surfaces that are to be secured together. For example, a first part may have a contact surface that is to be secured to a contact surface of a second part. A substantial portion (e.g., 40%, 50%, 60%. 75% or more) of the surface area of the contact surface of the first part that is to be secured to the second part may be covered with the electrically conductive member. An advantage of this design is that not just the outer perimeter of the parts are secured together, but that portions of the interior defined by the perimeter may be secured together thereby forming a stronger assembled part.

The electrically conductive member may have a cross-sectional area in the direction of flow of current that reduces in the direction of flow of current. For example, if a wire is used, the diameter of the wire may decrease in the direction of flow of current. An advantage of this design is that more uniform heat may be generated along the length of the wire. As a result, a more uniform bond may be achieved. The cross-sectional area may decrease at a generally constant rate along the length of the electrically conductive member. The rate of change of the cross-sectional area may be selected to create generally uniform heating along the length of the electrically conductive member. Alternately, the rate of change of the cross-sectional area may decrease in a staggered manner (e.g., the successively thinner wires may be connected together to form a wire having the desired length for a particular part).

In some embodiments, a single electrically conductive member may be used that that may be laid out in, e.g., a serpentine pattern. Alternately, a plurality of electrically conductive members may be provided that are connected in parallel. For example, a main electrically conductive member may be provided and a plurality of sub-electrically conductive members may be connected thereto in parallel. In such a case, the sub-electrically conductive members may have a smaller cross-sectional area than the main electrically conductive member. The main and/or sub-electrically conductive member may themselves have a constant cross-sectional area or the cross-sectional area may decrease at a constant or staggered rate in the direction of flow of the current.

The electrically conductive member may be applied directly on one or both of the surfaces that are to be secured together. Alternately, or in addition, the electrically conductive member may be positioned on a substrate that comprises, consists essentially of, or consists of a softenable or meltable material that may, when heated, soften or melt. If a substrate is used, the substrate may be positioned between the parts and the parts may then be brought together. For example, the substrate may be applied to one or both of the surfaces that are to be secured together. Alternately, the substrate may be positioned between the parts and the substrate held in place during the welding operation by being sandwiched between the parts that are to be secured together.

Once the parts with the electrically conductive member are correctly positioned, current may be applied to the electrically conductive member to generate heat. Once the surfaces of the assembled part that are adjacent the electrically conductive member have cooled sufficiently, the first and second component parts are secured together to form the assembled part.

The electrically conductive member may be a metal wire, which may adhered to a first surface of a component or to a substrate received between the first and second components, or the electrically conductive member may be a pattern of conductive ink, which may be printed on the first surface of a component or on a substrate received between the first and second components.

One or both of the first and second components may made of plastic. Alternately, the contact surfaces of one or both of the first and second components may made of plastic. It will be appreciated that one or both of the contact surfaces (or parts) may be made or any material that may be secured together by a softened or melted material (plastic) that is used as a substrate. For example, one or both of the surfaces (or parts) may be made of wood and/or metal.

In accordance with this broad aspect, there is provided a method of securing a first component part and a second component part together, the method comprising
  (a) providing an electrically conductive member between a first surface of the first component part and a facing first surface of the second component part wherein the electrically conductive member comprises a first portion connectable to a source of current and a second portion electrically connected to the first portion and comprising a plurality of sub-conductive members; and,
  (b) securing the first and second components together by passing a current through the electrically conductive member.

In any embodiment, the first face of the first component may have a surface area that is to be connected to the first face of the second component and the plurality of sub-conductive members may be distributed across at least 50% of the surface area.

In any embodiment, the first face of the first component may have a surface area that is to be connected to the first face of the second component and the plurality of sub-conductive members may be distributed across at least 75% of the surface area.

In any embodiment, the sub-conductive members may be generally evenly spaced apart from each other.

In any embodiment, the first portion of the electrically conductive member and each of the sub-conductive members may have a longitudinal length and a width in a direction transverse to the length and the width of each of the sub-conductive members may be narrower than the width of the first portion of the electrically conductive member.

In any embodiment, step (a) may comprise providing the electrically conductive member on a substrate and placing the substrate between the first surface of the first component part and the facing first surface of the second component.

In any embodiment, the substrate may be a meltable substrate at a temperature which is achieved when step (b) is conducted.

In any embodiment, at least the first component part may be not melted at a temperature which is achieved when step (b) is conducted. For example, at least the first component part may comprise wood and/or metal.

In accordance with this aspect, there is also provided a substrate having an electrically conductive member provided thereon wherein the electrically conductive member comprises a first portion connectable to a source of current and a second portion electrically connected to the first portion and comprising a plurality of sub-conductive members.

In any embodiment, a face of the substrate on which the electrically conductive member is provided may have a surface area and the sub-conductive members may be distributed across at least 50% of the surface area.

In any embodiment, a face of the substrate on which the electrically conductive member is provided may have a surface area and the sub-conductive members may be distributed across at least 75% of the surface area.

In any embodiment, the sub-conductive members may be generally evenly spaced apart from each other.

In any embodiment, the first portion of the electrically conductive member and each of the sub-conductive members may have a longitudinal length (e.g., in the direction of flow of current) and a width in a direction transverse to the length and the width of each of the sub-conductive members may be narrower than the width of the first portion of the electrically conductive member.

In accordance with this broad aspect, there is also provided a manufactured part comprising first and second component parts that are secured together, the manufactured part comprising an electrically conductive member positioned at an interface of the first and second component parts, wherein the electrically conductive member comprises a first lead portion and a plurality of sub-conductive members each of which extends from the lead first portion.

In any embodiment, the interface of the first and second parts may have a surface area and the sub-conductive members may be distributed across at least 50% of the surface area.

In any embodiment, the interface of the first and second parts may have a surface area and the sub-conductive members may be distributed across at least 75% of the surface area.

In any embodiment, the sub-conductive members may be generally evenly spaced apart from each other.

In any embodiment, the first portion of the electrically conductive member and each of the sub-conductive members may have a longitudinal length and a width in a direction transverse to the length and the width of each of the sub-conductive members may be narrower than the width of the first portion of the electrically conductive member.

In any embodiment, the first component part may be made of wood and/or metal.

In any embodiment, the first component part may be made of plastic.

In accordance with this aspect, there is also provided a method of securing a first component part and a second component part together, a first face of the first component has a surface area that is to be connected to a first face of the second component, the method comprising:
  (a) providing an electrically conductive member between the first surface of the first component part and the facing first surface of the second component part wherein the electrically conductive member is distributed across at least 50% of the surface area; and
  (b) securing the first and second components together by passing a current through the electrically conductive member.

In any embodiment, the electrically conductive member may be distributed across at least 75% of the surface area.

In any embodiment, the electrically conductive member may be distributed in a generally serpentine pattern.

In any embodiment, the electrically conductive member may comprise a single continuous electrically conductive member which has a plurality of portions extending along the surface area and the portions are generally evenly spaced apart from each other.

In any embodiment, the electrically conductive member may comprise a single continuous electrically conductive member, the electrically conductive member has a longitudinal length and a width in a direction transverse to the length and the width of the electrically conductive member decreases in the flow direction of current which is provided to the electrically conductive member.

In any embodiment, the width of the electrically conductive member may decrease generally continuously in the flow direction of current which is provided to the electrically conductive member.

In any embodiment, step (a) may comprise providing the electrically conductive member on a substrate and placing the substrate between the first surface of the first component part and the facing first surface of the second component.

In any embodiment, the substrate may be a meltable substrate at a temperature which is achieved when step (b) is conducted.

In any embodiment, at least the first component part may be not melted at a temperature which is achieved when step (b) is conducted.

In any embodiment, at least the first component part may comprise wood and/or metal.

In accordance with this aspect, there is also provided a substrate having an electrically conductive member provided thereon wherein a face of the substrate on which the electrically conductive member is provided has a surface area and the electrically conductive member is distributed across at least 50% of the surface area.

In any embodiment, the electrically conductive member may be distributed across at least 75% of the surface area.

In any embodiment, the electrically conductive member may be distributed in a generally serpentine pattern.

In any embodiment, the electrically conductive member may comprise a single continuous electrically conductive member which has a plurality of portions extending along the surface area and the portions are generally evenly spaced apart from each other.

In any embodiment, the electrically conductive member may comprise a single continuous electrically conductive member, the electrically conductive member has a longitudinal length and a width in a direction transverse to the length and the width of electrically conductive member decreases in the flow direction of current which is provided to the electrically conductive member.

In any embodiment, the width of electrically conductive member may decrease generally continuously in the flow direction of current which is provided to the electrically conductive member.

In accordance with this broad aspect, there is also provided a manufactured part comprising first and second component parts that are secured together, the part comprising an electrically conductive member positioned at an interface of the first and second component parts, wherein the electrically conductive member is distributed across at least 50% of the interface.

In any embodiment, the electrically conductive member may be distributed across at least 75% of the interface.

In any embodiment, the electrically conductive member may be distributed in a generally serpentine pattern.

In any embodiment, the electrically conductive member may comprise a single continuous electrically conductive member which has a plurality of portions extending along the interface and the portions are generally evenly spaced apart from each other.

In any embodiment, the electrically conductive member may comprise a single continuous electrically conductive member, the electrically conductive member has a longitudinal length and a width in a direction transverse to the length and the width of electrically conductive member decreases in the flow direction of current which is provided to the electrically conductive member.

In any embodiment, the width of electrically conductive member may decrease generally continuously in the flow direction of current which is provided to the electrically conductive member.

In any embodiment, the first component part may be made of wood and/or metal.

In any embodiment, the first component part may be made of plastic.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figures 1, 2, 3:
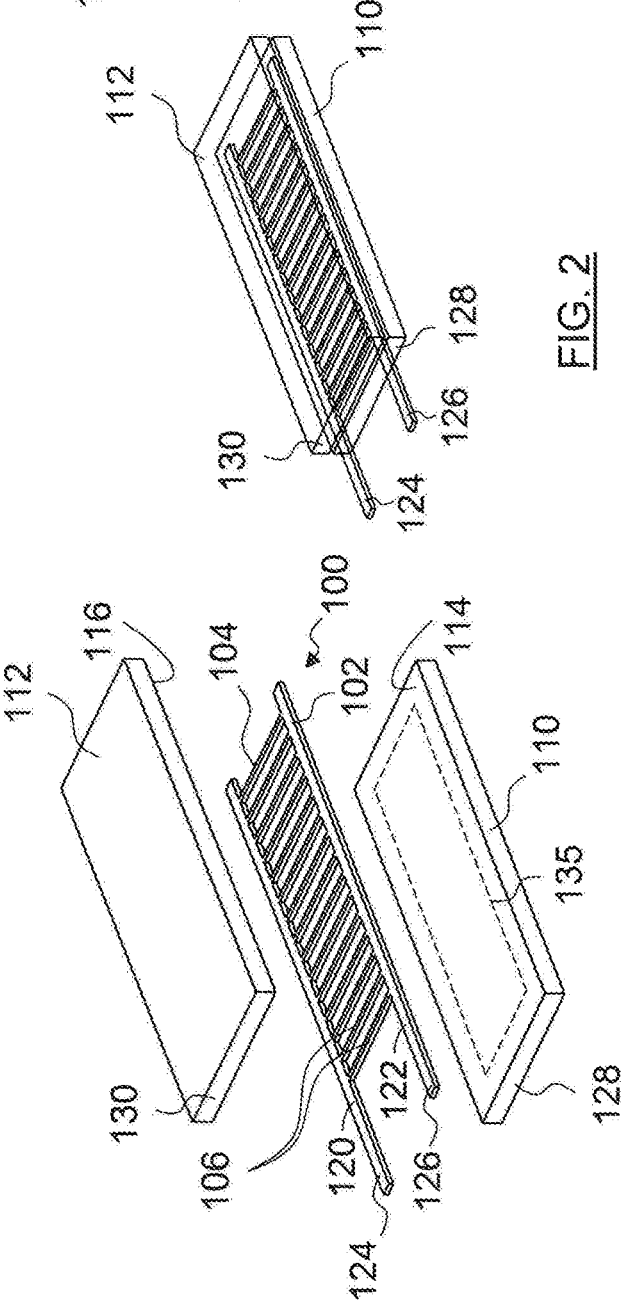
FIG. 1 is a top perspective exploded view of first and second component parts that are to be welded using an electrically conductive member.
FIG. 2 is a top perspective transparent view of the elements of FIG. 1 in an assembled configuration which are ready for welding.
FIG. 3, is a top transparent plan view of the elements of FIG. 1 in an assembled configuration which are ready for welding.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Referring to FIGS. 1 to 3, an exemplary embodiment of an electrically conductive member is shown generally as 100. In the illustrated embodiment, electrically conductive member 100 includes a first portion 102 and a second portion 104. First portion 102 is connectable to a source of current. For example, an electrical outlet or a battery or other power source may be connected to at least one point on first portion 102 to provide a current across electrically conductive member 100. Second portion 104 is electrically connected to first portion 102 and comprises a plurality of sub-electrically conductive members 106.

Electrically conductive member 100 is positioned between and spaced from a first component part 110 and a second component part 112. First component part 110 has a first surface 114 and second component part 112 has a first surface 116. First surface 116 is positioned facing first surface 114.

First and second surfaces 114, 116 may be referred to as contact surfaces as these are the surfaces to be secured together. First and second surfaces are exemplified as being generally planar. However, it will be appreciated that first and second surfaces may be of any shape which, generally contact each other when positioned in contact with each other. Accordingly, first surface 114 may have one or more protrusions that are receivable in a matting recess of surface 116.

Electrically conductive member 100 may be used to join first and second components 110, 112 together. For example, the resistance of electrically conductive member 100 may result in heat when a current is applied across electrically conductive member 100, and the heat may be used to soften or melt material from, e.g., the first and/or second plastic component. Softened or melted material may be used as an adhesive or joining portion to join the first component to a second component. Examples of plastics that may form or be included in or on one or both of a first component and a second component include thermoset and thermoplastic materials such as ethylene vinyl acetate (EVA), low density polyethylene (LDPE), and high-density polyethylene (HDPE). It will be appreciated that any resistively weldable plastic may be used.

In some embodiments, a first portion of an electrically conductive member 100 may include or be made up of one or more first portion members, and each members may be of any shape facilitating the flow of current through first portion 102. In the illustrated example, first portion 102 includes a first elongated member 120 and a second elongated member 122, which is exemplified as being parallel to the first elongated member 120.

The electrically conductive member 100 is configured to receive a current. For example, the electrically conductive member 100 may be heated by an induced current. Accordingly, for example, first portion 102 may be shaped (e.g., in a coil) so as to form an antenna to receive an induced current. Alternately, the electrically conductive member 100 may be physically connected to a source of current. For example, each of first elongated member 120 and a second elongated member 122 may include at least one segment extending up to or beyond an edge of at least one of first and second component parts 110, 112 when the electrically conductive member is sandwiched therebetween. In the illustrated example, each of first and second elongated members 120, 122 has an end 124, 126 extending beyond an edge 128 of first component part 110 and beyond an edge 130 of second component part 112 to facilitate connecting the first portion 102 to an external source of current. As such, ends 124, 126 may function as lead wires. It will be appreciated that electrically conductive member 100 may be provided with current by any means known in the resistive welding arts.

The first elongated member 120 may be electrically connected to the second elongated member 122 in various ways, such as by having one or more electrically conductive members extend therebetween. As discussed subsequently and as exemplified in FIGS. 11-19, one or more serpentine members may be used. Alternately, as exemplified in FIGS. 1-10, first and second elongated members 120, 12, which may be referred to as a main electrically conductive member, are electrically connected together by a plurality of parallel sub-electrically conductive members 106. As exemplified, sub-electrically conductive members 106 are each elongated members generally parallel to one another and generally perpendicular to first and second members 120, 122 of first portion 102. First and second members 120, 122 of first portion 102 are joined to one another across the plurality of members 106 so that a current introduced in one of first and second members 120, 122 may flow through to the other of first and second members 120, 122 through one or more of the plurality of sub-conductive members 106.

In the illustrated example, sub-electrically members 106 are spaced from one other by a sub-conductive member spacing 136 (FIG. 3) so as to form a gap or space between adjacent sub-electrically members 106. Sub-conductive members 106 may be unevenly or even generally randomly positioned or spaced. In addition, they may be of any shape and need not extend linearly. As exemplified in FIG. 3, sub-conductive members 106 are generally evenly spaced from each other and extend generally linearly. Accordingly, they are generally parallel to each other.

First portion 102 of the electrically conductive member 100 has a longitudinal length 140 in a direction of flow of current and a width 142 in a direction transverse to the length 140. Each of the sub-conductive members 106 also a longitudinal length 144 in a direction of flow of current and a width 146 in a direction transverse to the length 144. As illustrated, the width 146 of each of the sub-conductive members 106 is narrower than the width 142 of the first portion 102 of the electrically conductive member 100.

First portion 102 is dimensioned to carry sufficient current to provide current to all of the plurality of sub-conductive members 106. In the illustrated embodiment, first and second elongated members 120, 122 have a greater width then sub-conductive members 106 to allow first portion 102 to carry sufficient current to each of the members of second portion 104 so that all portions of the contact surface(s) are heated sufficiently for the resistive welding operation. In some embodiments, first portion 102 may be otherwise shaped to carry sufficient current, for example first portion 102 may also or alternatively be formed of a more conductive material than second portion 104.

In the illustrated embodiment, members of the electrically conductive member 100 are depicted as having a generally rectangular cross-section transverse to the longitudinal length of the members, the cross-section being generally non-varying along the length of the member. However, in other embodiments one or more of the members of the electrically conductive member 100 may have non-rectangular cross sections and/or cross sections which vary along the length of the member. For example, first member 120 of first portion 102 (or any one or more of the conductive members) may have a circular or free form cross section in some embodiments.

Electrically conductive member 100 is depicted in FIG. 2 adjacent first component 110 and second component 112. When electrically conductive member 100 is adjacent first component 110 and second component 112 a current may be passed through electrically conductive member 100 to soften or melt one or both of first surface 114 and second surface 116. For example, a current may be applied across electrically conductive member 100 from end 124 to end 126. The softened or melted material of one of the first faces 114, 116 may contact hard, softened, or melted material of the other of the first faces 114, 116 so that softened or melted material may act as an adhesive or joining portion. Softened or melted material may facilitate securing first component 110 and second component 112 together, such as to form a manufactured part out of joined first and second components 110, 112 with electrically conductive member 100 within the manufactured part.

In some embodiments, the first face 112 of the first component 11 has a surface area 135 that is to be connected to the first face 114 of the first component 110, and the plurality of sub-conductive members 106 are distributed across a substantial portion (e.g., 40%, 50%, 60%. 75% or more) of the surface area 135.

The surface area distribution may be increased by increasing the width or other dimension of one or more member of first or second portions 102, 104. However, in some embodiments surface area distribution may be increased by increasing the number of first or second portions 102 and/or the pattern in which electrically conductive member 100 is arrayed.

Figure 4:
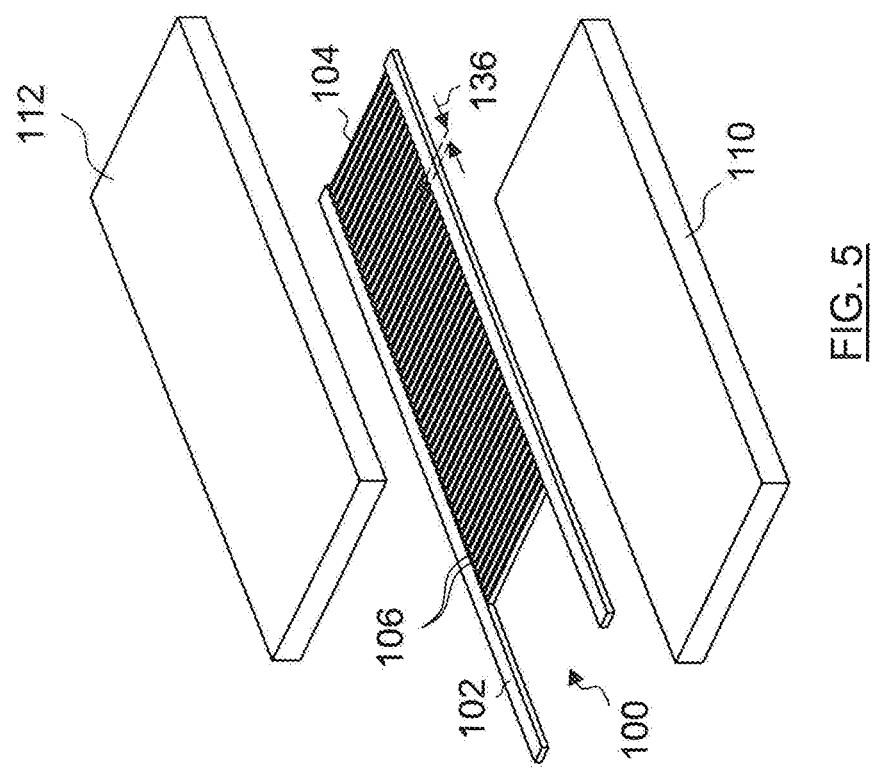
FIG. 4 is a top perspective exploded view of first and second component parts that are to be welded using an alternate electrically conductive member.
Figure 5:
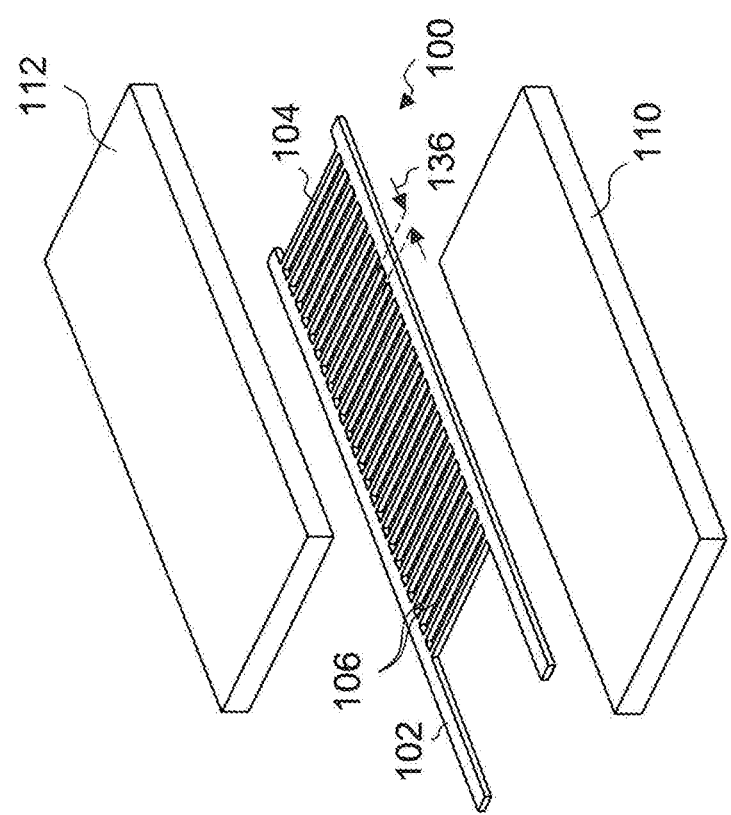
FIG. 5 is a top perspective exploded view of first and second component parts that are to be welded using a further alternate electrically conductive member.
Figure 7:
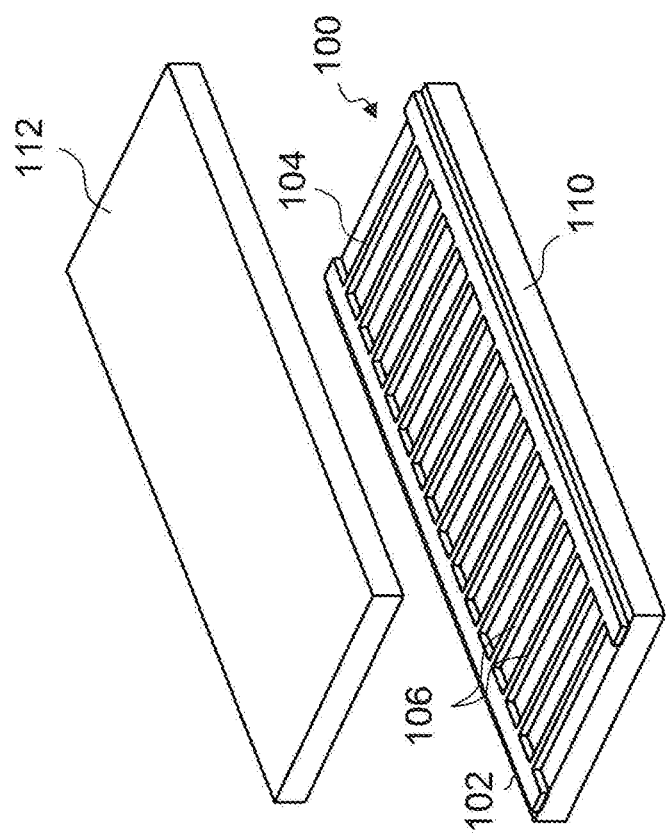
FIG. 7 is a top perspective partially exploded view of first and second component parts that are to be welded using a further alternate electrically conductive member.
Figure 6:
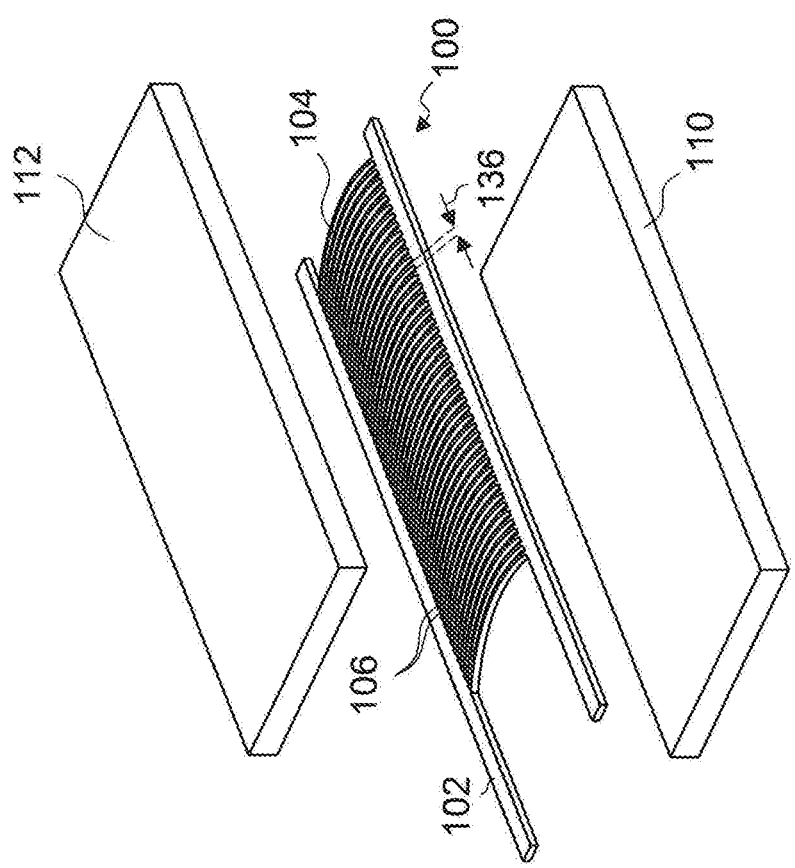
FIG. 6 is a top perspective exploded view of first and second component parts that are to be welded using a further alternate electrically conductive member.
Figure 9:
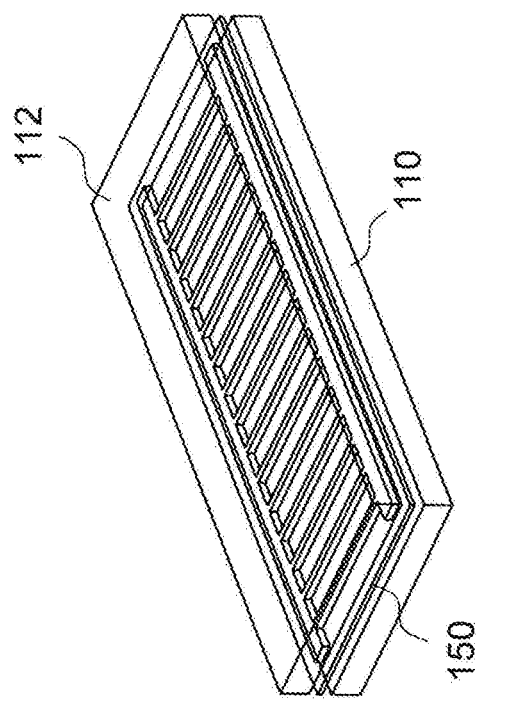
FIG. 9 is a top perspective transparent view of the elements of FIG. 8 in an assembled configuration which are ready for welding.

As exemplified in FIGS. 4 to 6, the number of sub-conductive members 106 may be increased to increase the surface area distribution. It will be appreciated that, for a given size contact surface and a given width of the sub-conductive members 106, as the number of sub-conductive members 106 increases, the size of the sub-conductive member spacing 136 decreases. In the examples illustrated in FIGS. 4 and 5, the reduction in sub-conductive member spacing 136 from one to the other is directly proportional to the increase in the number of sub-conductive members 106 in a given area, since the width of the sub-conductive members 106 does not change. It will be appreciated that as the number of sub-conductive members 106 increases, the width of the sub-conductive members 106 may decrease since each sub-conductive members 106 essentially has to heat a smaller volume of material.

Sub-conductive members 106 may not be perpendicular to first portion 102 and/or may not be straight. In some embodiments, first and/or second portion 102, 104 may be or include a non-linear member, such as a serpentine member, a curved member, or a member of varying width or shape. Similarly, in some embodiments first portion 102 may include only a single member. As exemplified in FIG. 6, sub-conductive members 106 are arcuate in shape and are generally evenly spaced apart.

As exemplified in FIGS. 11-17, the surface area distribution is increased by the pattern in which the electrically conductive member 100 is arrayed. The pattern may be shaped to distribute heat across the contact surface in a generally even distribution. As exemplified therein, electrically conductive member 100 is arrayed in a serpentine pattern. In other embodiments, it will be appreciated that the pattern need not be serpentine but may be random.

As exemplified in FIGS. 11-17 electrically conductive member 100 is a single continuous member. However, it will be appreciated that it could be a plurality of continuous members laid out in a serpentine or other pattern. In particular, the pattern that is used may be selected based on the shape of the parts to be connected. For example, electrically conductive member 100 may include branching portions or grid-patterned portions, or may be a single continuous electrically conductive member arranged in a spiral or other pattern As discussed with respect to FIGS. 1-10, the width of the electrically conductive member 100 that is laid out in a pattern need not be uniform. The width may decrease in the direction of flow. Alternately, or in addition, the spacing of portions of the electrically conductive member 100 from each other need not be uniform. Optionally, the pattern, the width and the spacing is selected to provide generally uniform heating to the surface to be connected.

Figure 12:
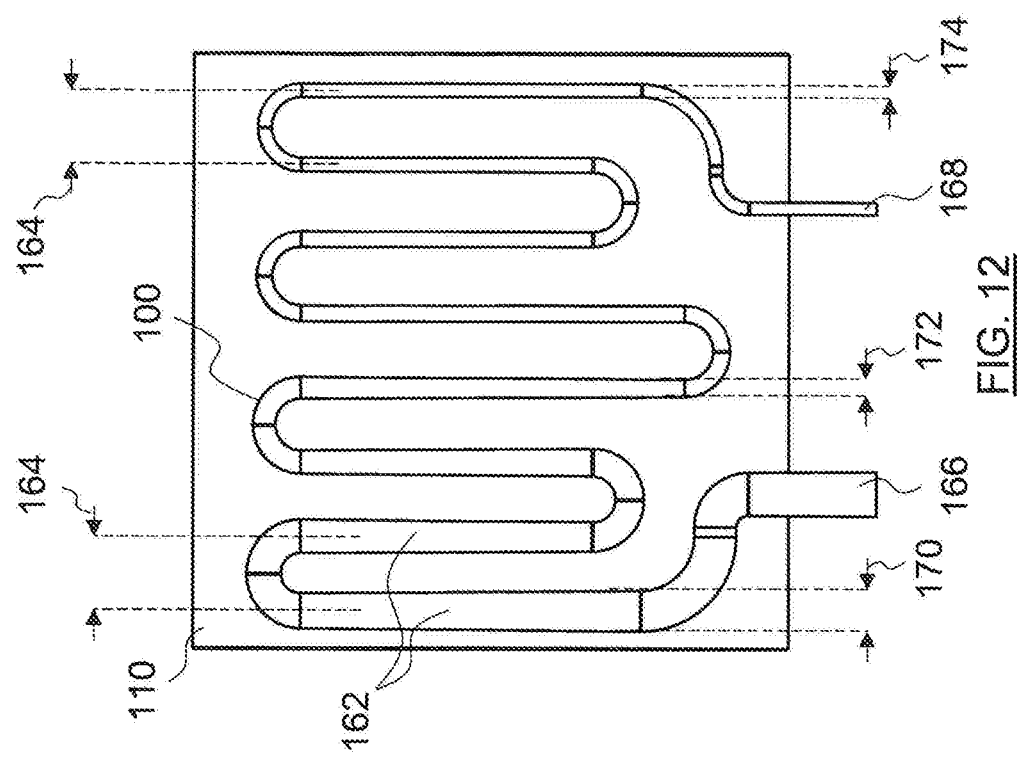
FIG. 12 is a top perspective transparent view of the elements of FIG. 11 in an assembled configuration which are ready for welding.
Figure 11:
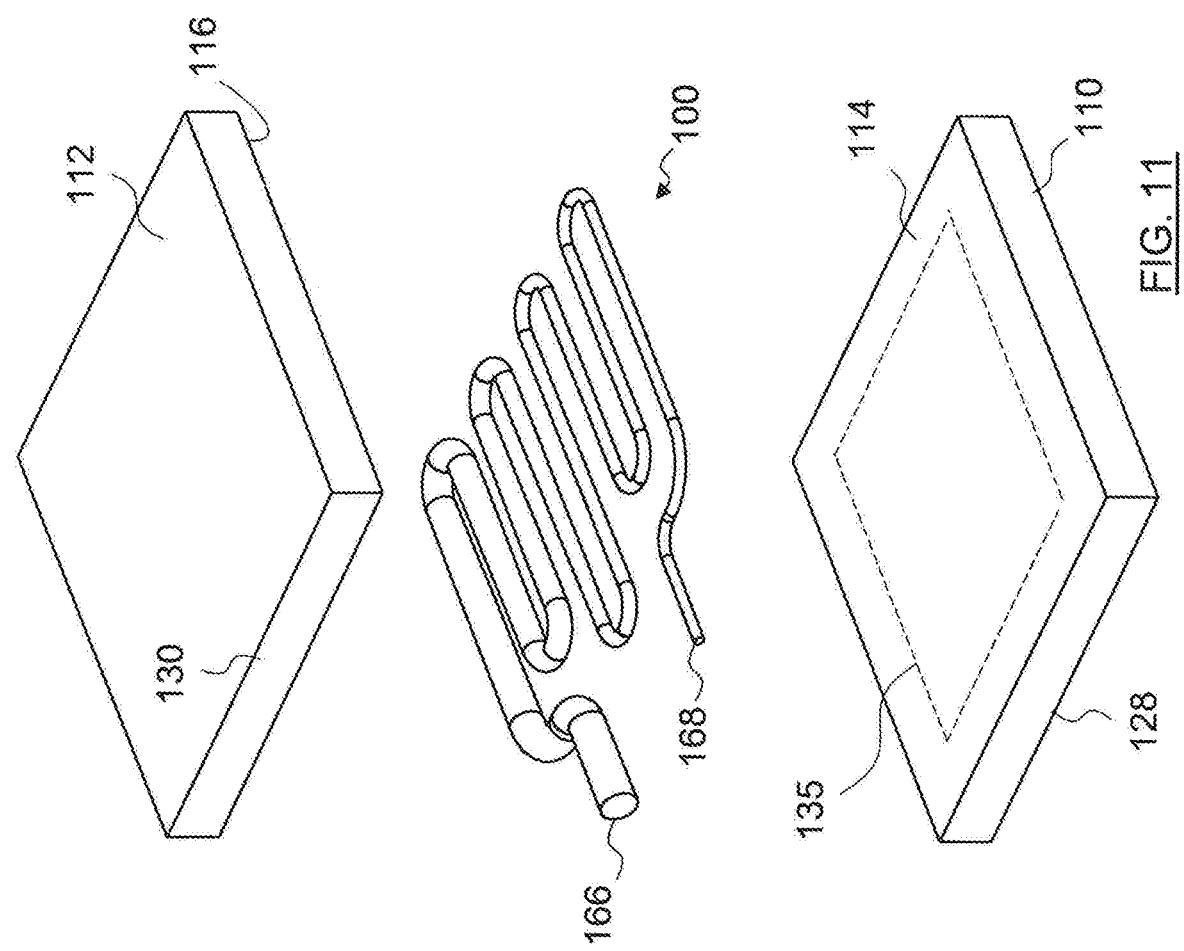
FIG. 11 is a top perspective partially exploded view of first and second component parts that are to be welded using a further alternate electrically conductive member.

As exemplified in FIGS. 11 and 12 electrically conductive member 100 is arrayed in a generally serpentine pattern as a single continuous electrically conductive member 100, which comprises a plurality of portions 162 extending along the surface area 135. Optionally, as exemplified, the portions 162 are generally evenly spaced apart from each other and are generally parallel to one another.

In the embodiment of FIGS. 11 and 12, electrically conductive member 100 has a width 170 adjacent first end 166, a width 172 at a midway point between first end 166 and second end 168, and a width 174 adjacent second end 168. Width 170 is greater than width 172, and width 172 is greater than width 174. In some embodiments, the decrease in width may be generally continuous in the flow direction of current which is provided to the electrically conductive member. A decreasing width may accommodate a voltage drop and be used to facilitate an even heat distribution across an underlying surface.

Figure 14:
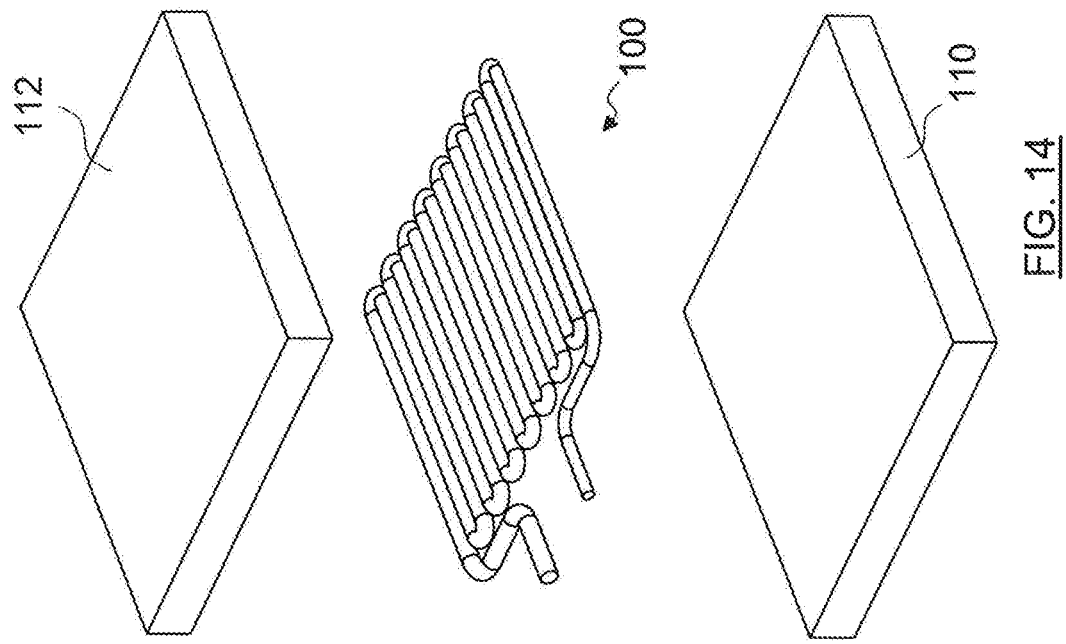
FIG. 14 is a top perspective partially exploded view of first and second component parts that are to be welded using a further alternate electrically conductive member.
Figure 13:
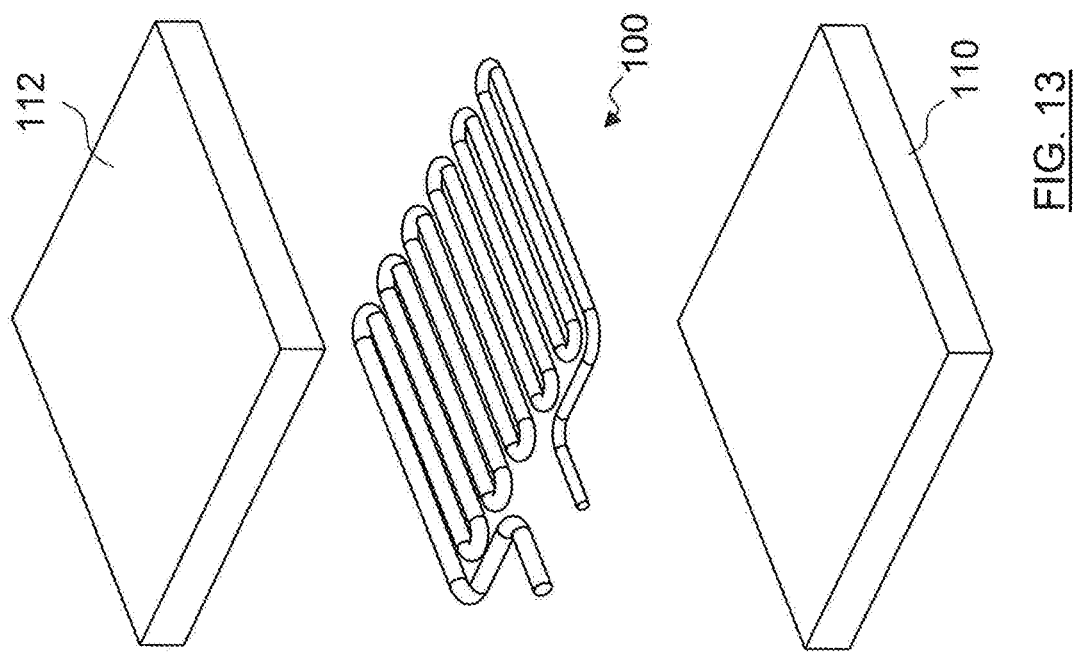
FIG. 13 is a top perspective partially exploded view of first and second component parts that are to be welded using a further alternate electrically conductive member.
Figure 16:
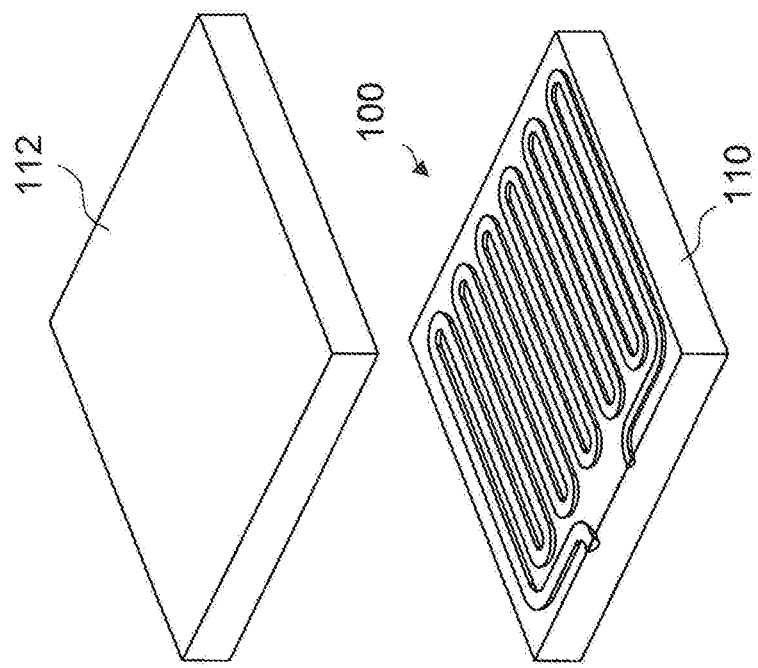
FIG. 16 is a top perspective partially partially exploded view of first and second component parts that are to be welded using a further alternate electrically conductive member.
Figure 15:
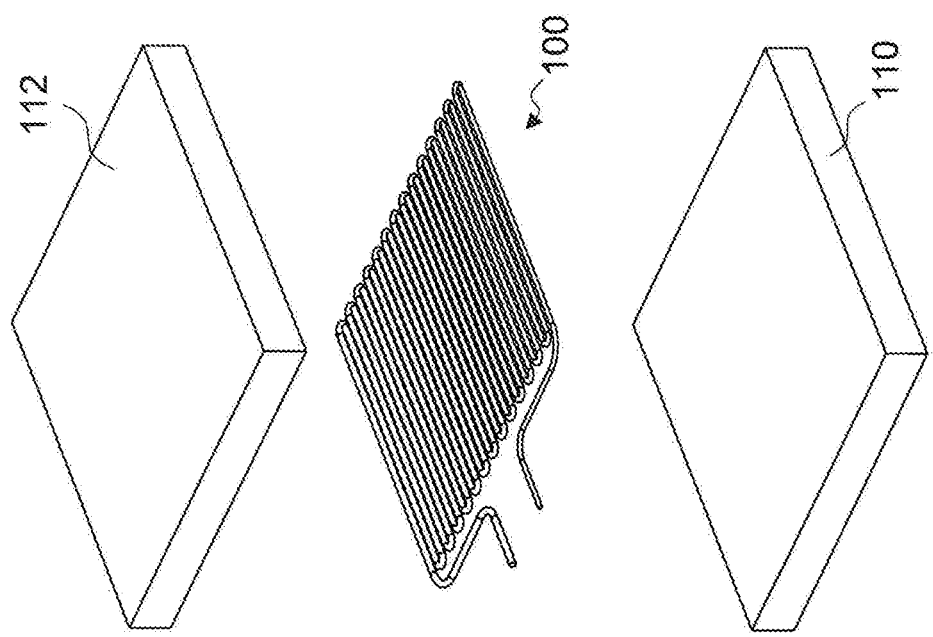
FIG. 15 is a top perspective partially exploded view of first and second component parts that are to be welded using a further alternate electrically conductive member.
Figure 18:
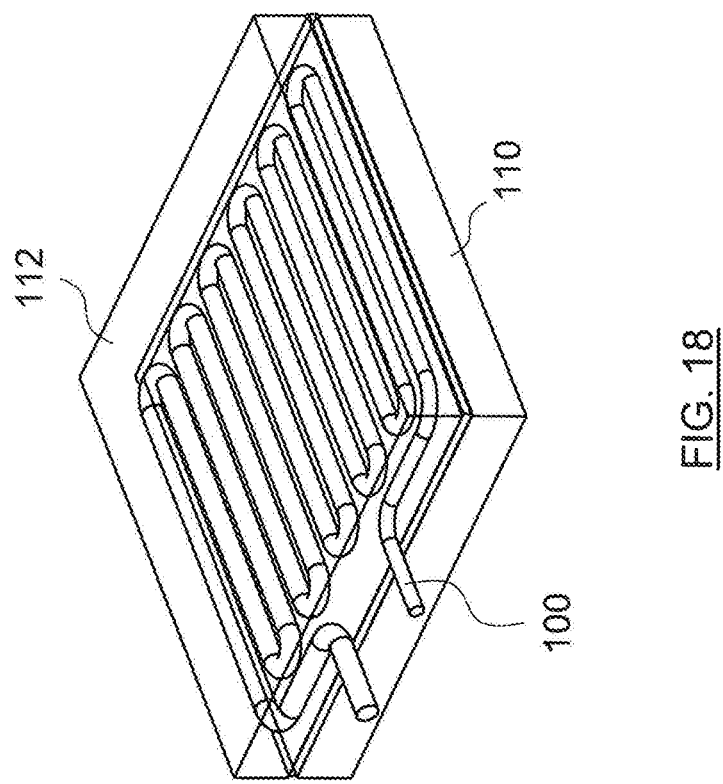
FIG. 18 is a top perspective transparent view of the elements of FIG. 17 in an assembled configuration which are ready for welding; and, FIG. 19 is a top perspective transparent view of a manufactured part using the electrically conductive member of FIG. 11.

FIGS. 13 to 15, exemplify electrically conductive members 100 having various numbers of portions 162. As depicted, increasing the number of portions may increase the distribution of electrically conductive member 100, even as the size of the portions is decreased. As with sub-conductive members 106, spacing 164 between portions 162 may be reduced as the number of portions 162 increases. While portions 162 may be unevenly or even generally randomly positioned or spaced, in some embodiments as illustrated, portions 162 may be generally evenly spaced from each other.

As exemplified in FIGS. 13-15, electrically conductive member 100 is depicted as having a generally circular cross section transverse to the longitudinal length of the portions 162. However, as with an electrically conductive member 100 having a plurality of sub-conductive members 106, one or more of the portions of the electrically conductive member 100 may have non-circular cross sections. For example, portions 162 may have rectangular cross sections.

Electrically conductive member 100 may be a separate component and may therefore not be affixed to one of first and second components 110, 112. For example, electrically conductive member 100 may be self-supporting (e.g., a wire, such as copper wire).

Figure 8:
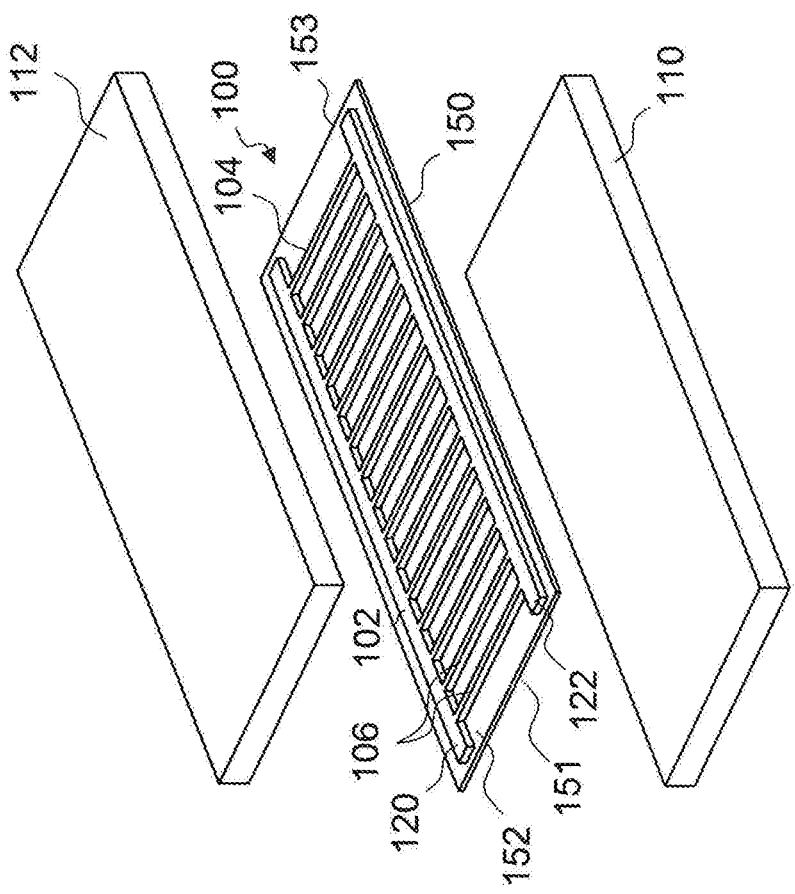
FIG. 8 is a top perspective exploded view of first and second component parts that are to be welded using an alternate electrically conductive member that is provided on a substrate.
Figure 10:
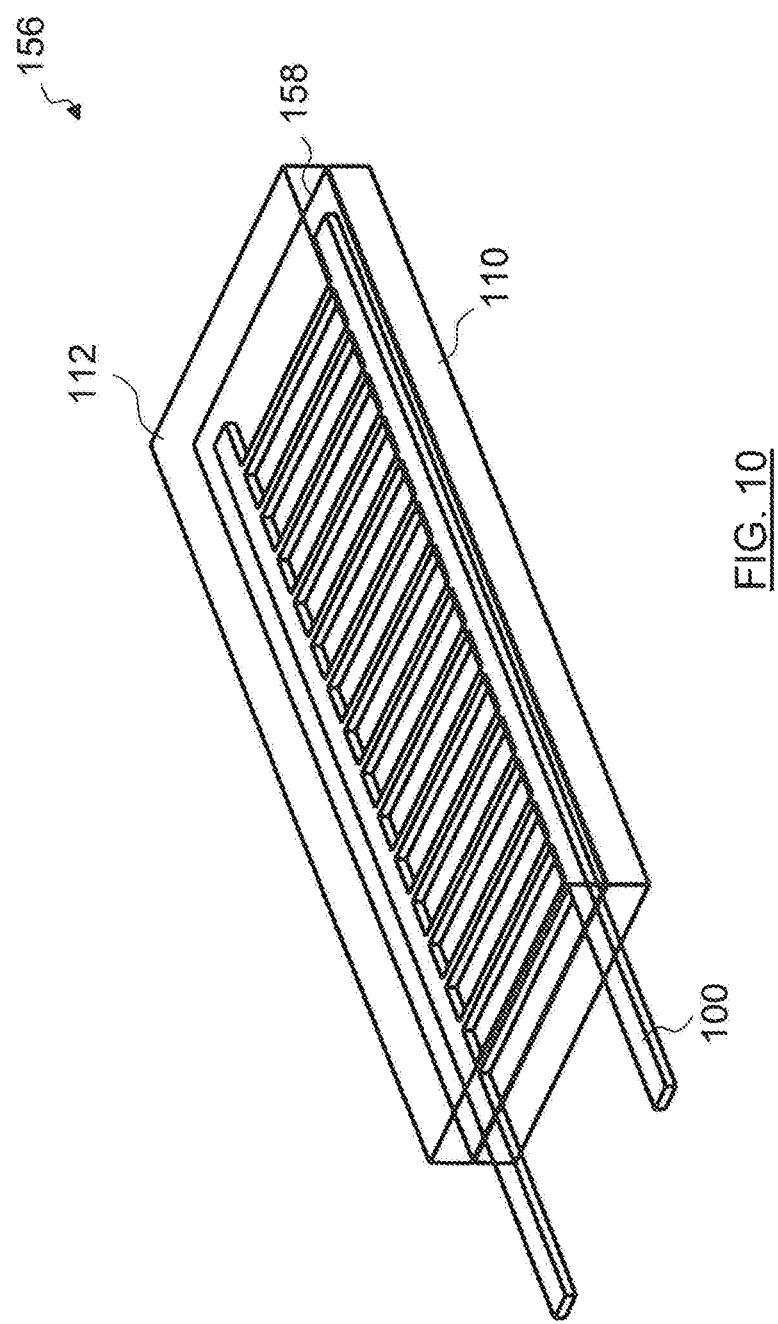
FIG. 10 is a top perspective transparent view of a manufactured part using the electrically conductive member of FIG. 8.
Figure 17:
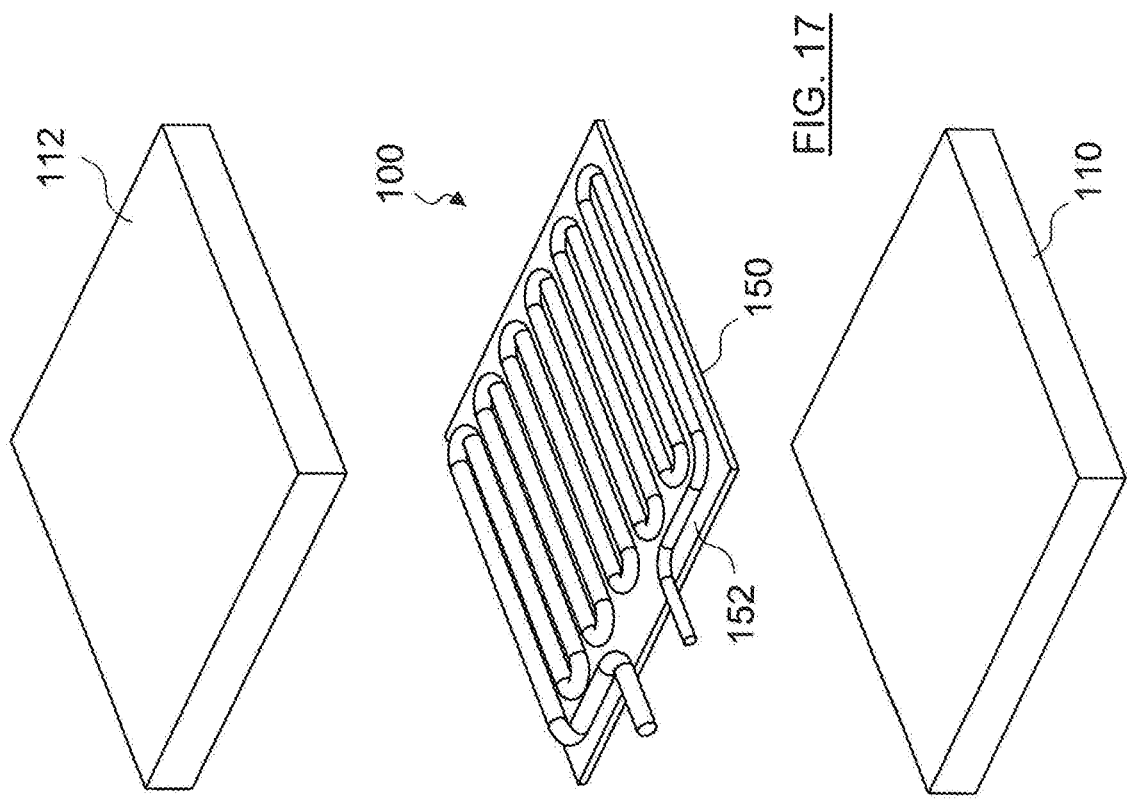
FIG. 17 is a top perspective exploded view of first and second component parts that are to be welded using an alternate electrically conductive member that is provided on a substrate.
Figure 19:
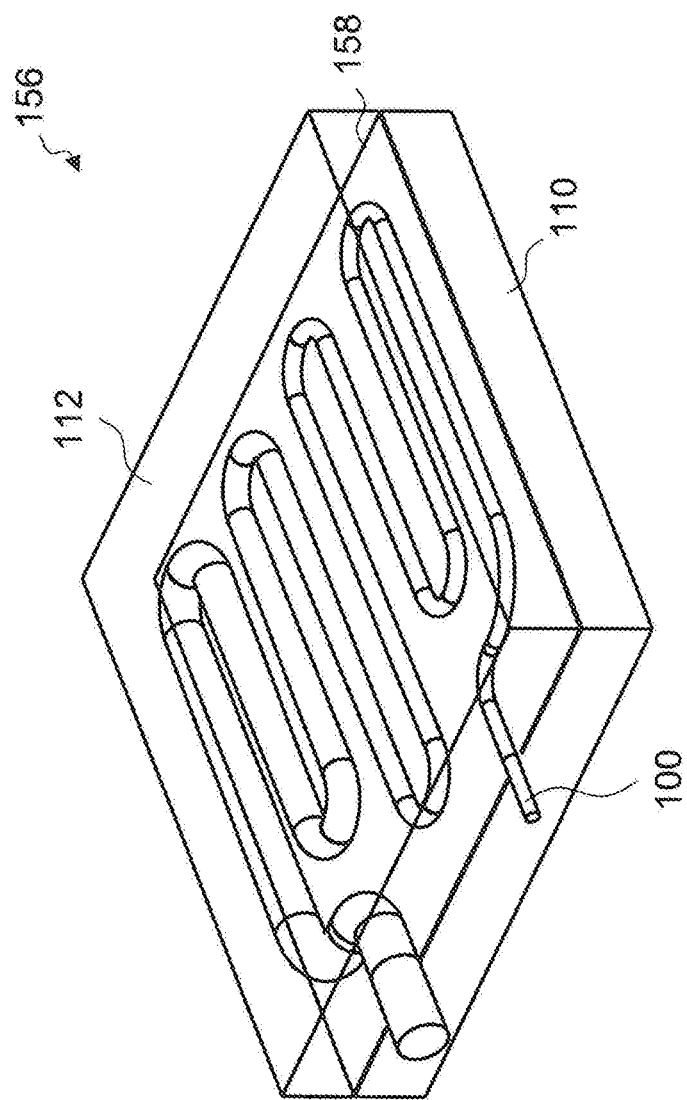

Alternately, as exemplified in FIGS. 8 and 17, electrically conductive member 100 may be provided on a substrate 150 and, as such, it need not be self-supporting. An example of a non-self-supporting electrically conductive member 100 is a conductive ink, such as silver ink, a gold ink, an aluminum ink, or a carbon ink or a combination thereof printed on first surface 116

Alternatively, whether self-supporting or not, electrically conductive member 100 may be affixed to or printed on one of first and second components 110, 112 (e.g., first surface 116 of second component 104).

For example, electrically conductive member 100 may be made of or include wire, such as copper wire, and held on first surface 116 by an adhesive or by an earlier melting or partial-melting process or any other method known in the resistive welding arts. Alternatively or additionally, electrically conductive member 100 may be a conductive ink that is printed on first surface 116 (see for example FIGS. 7 and 16).

It will be appreciated that an electrically conductive member 100 may be affixed to or printed on each of first and second components 110, 112.

It will be appreciated that a single electrically conductive member 100 may be of various constructions. For example, in some embodiments, part of electrically conductive member 100 may be wire and part may be printed. Accordingly, for example, first portion 102 may be made of wire received and second portion 104 may be a conductive ink. Alternately, for example, first portion 102 may be formed of a silver ink while second portion 104 may be formed of a carbon ink.

As exemplified in FIGS. 8, 9, 17 and 18 electrically conductive member 100 is provided on a surface 152 of a substrate 150, such as by printing or adhesion. The substrate 150 is placed between a first surface 114 of a first component part 110 and a facing first surface 116 of a second component part 112. Examples of plastic components that may form or be included in or on a substrate include thermoset and thermoplastic materials such as ethylene vinyl acetate (EVA), low density polyethylene (LDPE), and high-density polyethylene (HDPE). Any resistively weldable plastic may be used. In some embodiments, a substrate 150 may be reinforced, such as by an optional fiberglass or metal weave or mesh.

For example, a substrate 150 with an applied electrically conductive member 100 may be applied as a tape onto one or both of a first component part and a second component part 110, 112 or between a first component part 110 and a second component part 112. In some embodiments, a tape made of or including a substrate 150 and an electrically conductive member 100 may have a material applied to one or both of a top and bottom surface to allow the tape to be adhered to a surface before a current is provided to the electrically conductive member, such as a contact cement or a releasable adhesive.

In some embodiments a tape may be provided as a continuous roll or a series of segments of substrate 150 with an applied electrically conductive member 100. For example, substrate 150 of FIG. 8 may be joined at first end 151 to a second end 153 of a similar substrate 150 to form a longer tape. In some embodiments, the ends of first and second members 120, 122 may extend to the first and second ends 151, 153 to be joined to the ends of corresponding first and second members 120, 122 of abutting tape segments.

It will be appreciated that one or both of first component part 110 and a second component part 112 may be made of a material that is resistively weldable together. In such a case, a substrate may not be used. Alternately, if neither first component part 110 and a second component part 112 are made of a material that is resistively weldable together then a resistively weldable substrate is used. Accordingly, in some embodiments, the substrate may be the only component that is to melt at the temperature at which the resistive welding occurs.

For example, in some embodiments, substrate 150 is a meltable substrate at a temperature which is achieved when a current is passed through electrically conductive member 100 and components 110, 112 may be made of a material(s) that will not melt at the temperature at which the resistive welding is conducted. For example, the components 110, 112 may be made of a higher melting point plastic or wood or metal. In alternate embodiments, substrate 150 may be melted in addition to one or both of first surface 114 an first surface 116. When substrate 150 is melted the substrate 150 may act as part or all of the adhesive or joining portion when melted and after cooling to secure first component 110 and second component 114 together.

Accordingly, it will be appreciated that the use of a substrate may enable the joining of a first component 110 and a second component 112 wherein heat generated by a current flowing through an electrically conductive member 100 may not cause a softening or melting of components 110, 112 at all or at a practical level of current. For example, first component 110 and second component 112 (or at least the contact surface of first and second components 110, 112) may be each be individually selected from wood, metal or a similar material.

In other embodiments, a substrate may be used wherein the first and/or second component may be resistively weldable. For example, a temperature produced may be high enough to melt a substrate 150 such as a plastic substrate without being high enough to melt first and second components 110, 112, which may also be made of a resistively weldable plastic. For example, the substrate may have a slightly lower melting point (10° C., 20° C. or 30° C.) than components 110,112. The resistive welding may be conducted so as not to melt or significantly melt the components 110, 112. In such a case, the shape and/or dimensions of the mating surfaces may not be affected by the resistive welding. Accordingly, a substrate may be used to allow for a shorter current duration, such as 10 seconds, even if a longer current duration would provide enough energy to melt a surface of one or both of first and second components 110, 112.

An advantage of using a substrate is that parts made of non-resistively weldable material may be secured together by resistive welding. Such a design may be beneficial to avoid the use of mechanical fasteners which may otherwise provide hazards during use of a manufactured part.

For example, a substrate 150 with an applied electrically conductive member 100 may be used in forming a reel, such as a wooden reel for holding electrical wire. A substrate 150 with an applied electrically conductive member 100 may be used to join layers of wood or material including wood products, such as to form an end caps of a reel and/or to secure the end caps to the hub of a reel. The substrate 150 and applied electrically conductive member 100 may be, for example, applied during manufacturing, and added as a sheet placed between layers of wood product, and then heat may be generated by a current in electrically conductive member 100 to melt substrate 150 to join the layers of wood product. This may avoid the use of, e.g., nails that are used to otherwise manufacture a reel. The avoidance of using nails avoids the potential for a nail to puncture the insulation of wire would on a cord reel or a hose wound on a reel.

In another example, a substrate 150 with an applied electrically conductive member 100 may be used to join a wall or floor tile to an underlying surface. The wall or floor tile may be formed of a stone, ceramic, or similar material, and substrate 150 may be melted to join the tile to an underlying surface such as concrete or a wood subfloor. Use of substrate 150 and applied electrically conductive member 100 may facilitate efficient application of tiles as compared to relying upon grout to join tile and underlying surface.

In some embodiments, multiple tiles or other construction material portions may be attached to a face of a substrate 150 having an electrically conductive member 100 thereon. For example, a temporary adhesive may be applied to one or more faces of a substrate 150 to hold tiles in a desired pattern to be applied to a surface. A temporary adhesive may hold construction material temporarily, and the electrically conducive material 100 may have a current applied thereto to soften or melt substrate 150 due to resistance heating of the electrically conductive material. The softened or melted substrate 150 may then be used to provide a permanent bond between the construction material and the environmental surface.

In some embodiments, a sheet may be made up of multiple substrates 150 each with an electrically conducive member 100. For example, a user may apply the sheet to a surface that is to be tiled, such as by using a temporary adhesive on a back face of the sheet opposite the face on which the electrically conductive members 100 are formed, and then energize each electrically conductive member as the user is ready to apply a tile to that portion of the sheet.

A further application includes the roofing industry, where a first surface of a first asphalt shingle and a facing first surface of a second asphalt shingle may each be melted and held together to join the first and second asphalt shingles to one another. Melted asphalt may provide an adhesive bond between the first and second asphalt shingles. The bond may increase in strength during exposure of the roof to the sun after a current through an electrically conductive member is removed and the asphalt cools.

In some embodiments, an electrically conductive member such as electrically conductive member 100 may be monitored when a current is applied to provide information to a user about the state of the underlying material such as substrate 150 or one or both of first surfaces 114, 116. For example, one or more of a voltage drop across electrically conductive member 100, an elapsed time, a temperature of electrically conducive member 100, and a supply current magnitude may be measured. In some embodiments, as the temperature of an electrically conductive member increases the resistance drops, and when a constant current is applied, the voltage will change proportionally with the resistance. Accordingly a predetermined voltage drop may indicate that a predetermined desired temperature has been reached.

Alternately or in addition, in some embodiments, power and time may be measured to detect when a predetermined sufficient amount of power has been supplied.

Alternately or in addition, in some embodiments, a color changing material may be applied to or incorporated into a substrate, component, or electrically conductive member, and a change in color of the color changing material may indicate that a desired temperature has been reached.

Alternately or in addition, in some embodiments, a tool used to apply current may be configured to end the current supply when a predetermined welding operation end criteria has been detected, such as a predetermined voltage drop.

In some embodiments, a tape gun may be used to dispense a tape made of the substrate 150 with an electrically conductive member 100 applied on substrate 150 and optional temporary adhesive on at least one face of substrate 150. The tape gun may be able to selectively energize the electrically conductive member. For example, the tape gun may be able to dispense a segment of tape from a roll of tape, cut the segment to separate it from the remainder of the roll of tape, and then apply a current across the electrically conductive member 100 on the segment sufficient to adhere the tape to the surface in preparation for a subsequent resistive welding operation.

In some embodiments, a component such as first or second component 110, 112 or a substrate such as substrate 150 may be or include a foaming or blowing agent. For example, substrate 150 may be a foaming agent activated by heat to provide a soft cushioning layer between a first component 110 and a second component 112 in addition to or as an alternative to securing first and second components 110, 112 together.

In some embodiments, after an electrically conductive member 100 is heated to secure a first and second component 110, 112 together, a current may again be applied to allow first and second components 110, 112 to be separated.

For example, if the electrically conducive integrity of electrically conductive member 100 is preserved as a substrate material or a material from a face of first or second component 110, 112 is melted and cooled, a current can again be applied across the electrically conductive member 100 to again melt the material. However, in some embodiments the electrically conducive integrity of the electrically conductive member 100 may not persevered, such as when the electrically conductive member 100 is formed of or includes conductive ink. When underlying material is melted, conducive ink traces may be broken or otherwise disturbed and the electrically conducive integrity of electrically conductive member 100 may be compromised.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method of securing a first component part and a second component part together, the method comprising:
   (a) providing a meltable substrate, which has an electrically conductive member directly provided thereon, between a first surface of the first component part and a facing first surface of the second component part wherein the electrically conductive member comprises a first portion connectable to a source of current and a second portion electrically connected to the first portion and comprising a plurality of sub-conductive members;
   (b) melting the meltable substrate at a melting temperature achieved by passing a current through the electrically conductive member, wherein essentially only the meltable substrate melts at the melting temperature, and
   (c) after step (b), cooling the meltable substrate whereby the first and second component parts are secured together.

2. The method of claim 1 wherein the first surface of the first component part has a surface area that is to be connected to the first surface of the second component part and the plurality of sub-conductive members are distributed across at least 50% of the surface area.

3. The method of claim 1 wherein the first surface of the first component part has a surface area that is to be connected to the first surface of the second component part and the plurality of sub-conductive members are distributed across at least 75% of the surface area.

4. The method of claim 1 wherein the sub-conductive members are generally evenly spaced apart from each other.

5. The method of claim 1 wherein the first portion of the electrically conductive member and each of the sub-conductive members has a longitudinal length and a width in a direction transverse to the length and the width of each of the sub-conductive members is narrower than the width of the first portion of the electrically conductive member.

6. The method of claim 1 wherein at least the first component part comprises wood.

7. The method of claim 1, wherein the meltable substrate has a lower melting point than each of the first and second component parts.

8. A meltable substrate having an electrically conductive member provided thereon wherein the electrically conductive member comprises a first portion connectable to a source of current and a second portion electrically connected to the first portion, the second portion comprising a plurality of sub-conductive members, wherein the meltable substrate is made of a material that comprises a resistively weldable plastic, wherein a face of the substrate on which the electrically conductive member is provided has a surface area and the sub-conductive members are distributed across at least 50% of the surface area.

9. The meltable substrate of claim 8 wherein the sub-conductive members are distributed across at least 75% of the surface area.

10. The meltable substrate of claim 8 wherein the sub-conductive members are generally evenly spaced apart from each other.

11. The meltable substrate of claim 8 wherein the first portion of the electrically conductive member and each of the sub-conductive members has a longitudinal length and a width in a direction transverse to the length and the width of each of the sub-conductive members is narrower than the width of the first portion of the electrically conductive member.

12. A method of securing a first component part and a second component part together, the method comprising:
   (a) providing an assembly consisting of a meltable substrate, which has an electrically conductive member secured thereto, between a first surface of the first component part and a facing first surface of the second component part, wherein the meltable substrate is separate from the first and second component parts before performing step (a), wherein the electrically conductive member is connectable to a source of current, wherein the meltable substrate has a lower melting point than both the first surface of the first component part and the first surface of the second component part;
   (b) melting the meltable substrate at the lower melting point by passing a current through the electrically conductive member, and
   (c) after step (b), cooling the meltable substrate to form a joining portion whereby the first surface of the first component part and the first surface of the second component part are secured together by the joining portion which contacts the first surface of the first component part and the first surface of the second component part.

13. The method of claim 12, wherein only the meltable substrate melts at the melting temperature achieved by passing the current through the electrically conductive member.

14. The method of claim 12, wherein the electrically conductive member comprises a first portion connectable to the source of current and a second portion electrically connected to the first portion and comprising a plurality of sub-conductive members.

15. The method of claim 12, wherein the meltable substrate consists of a resistively weldable plastic.

16. The method of claim 12, wherein the meltable substrate consists essentially of a single layer of resistivity weldable plastic.

* * * * *